Figure 1:
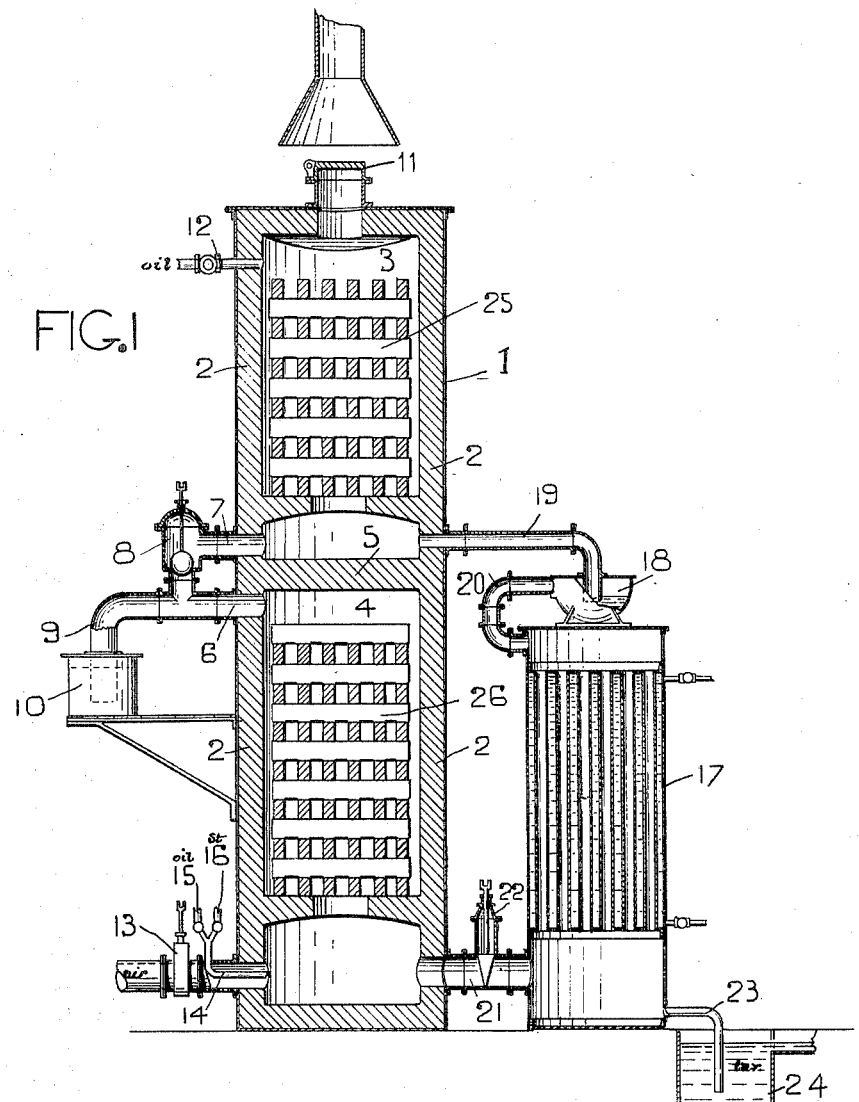

No. 817,126. PATENTED APR. 3, 1906.
L. P. LOWE.
METHOD OF MANUFACTURING GAS.
APPLICATION FILED MAR. 4, 1902.

WITNESSES
INVENTOR

UNITED STATES PATENT OFFICE.

LEON P. LOWE, OF SAN FRANCISCO, CALIFORNIA.

METHOD OF MANUFACTURING GAS.

No. 817,126. Specification of Letters Patent. Patented April 3, 1906.

Application filed March 4, 1902. Serial No. 96,622.

*To all whom it may concern:*

Be it known that I, LEON P. LOWE, a citizen of the United States, residing at San Francisco, State of California, have invented a new and useful Improvement in Methods of Manufacturing Gas and Recovering By-Products, which improvement is fully set forth in the following specification and accompanying drawings.

My invention consists in a method of generating manufactured gases from hydrocarbon oils, preferably in the form of crude petroleum, simultaneously recovering certain by-products, usually in the form of so-called "oil-tar."

My invention embodies novel features, as will be hereinafter fully set forth and definitely claimed.

In the manufacture of oil-gases and the recovery of the by-products therefrom it is customary to do so by externally heating clay retorts, simultaneously internally admitting hydrocarbon oils which are converted into fixed gases and condensable hydrocarbon substances, the former being in the shape of the so-called "oil-gas" of heavy gravity and high candle-power, while the latter is in the form of so-called "oil-tar." This process of manufacturing gas has many disadvantages, and its successful use is limited to the handling of comparatively light and easily-distilled oils, while the resulting rich gas has not, generally speaking, been found a commercial and practicable substance for delivery and use through street-pipes in the ordinary manner.

I have found that if rich oil-gases are subjected to a degree of heat sufficiently high to break down a portion of the rich heavy hydrocarbons into a solid substance, usually in the form of lampblack, the remaining gas is of lower candle-power and lighter gravity, and which is, generally speaking, a commercially successful gas for distribution in the ordinary manner. Gas so manufactured must be rigorously treated before use to thoroughly cleanse and free it from lampblack and tarry substances, and heretofore this has been only practically done by bringing the combined mixture of fixed gases, condensable hydrocarbons, and solid carbonaceous substances directly in contact with water and recovering each separately. By so doing the liquid hydrocarbons and solid carbonaceous substances are more or less intermixed, in addition to which they carry such a large amount of water as to make them practically useless for distillation into more refined products. If oils are subjected to a certain degree of heat, and that only sufficiently high to convert same into fixed gases and condensable hydrocarbon liquids, and if the latter be removed prior to the subjecting of the gas to the high degree of heat necessary for the breaking down of a portion of the heavy hydrocarbons into solid carbons, it is practicable to recover the tarry substances in a separate and refined condition, in which state they may have a commercial and marketable value and the lamp-black can be subsequently recovered in a comparatively pure state, or it can be used in a simultaneous operation for the decomposition of steam in connection with gas-making, thus increasing the amount of gas recovered, and this I accomplish in an apparatus which I have devised, shown in the accompanying drawings, and of which the following is a description.

Figure 2:
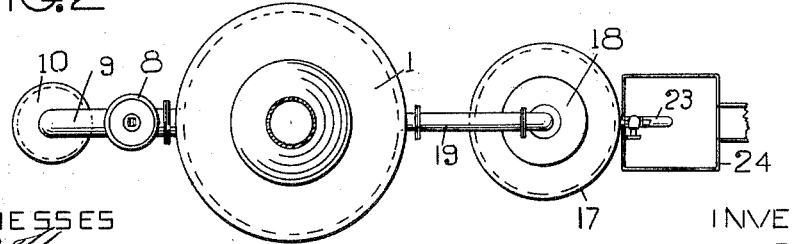

Figure 1 represents a vertical sectional elevation of the apparatus embodying my invention. Fig. 2 represents a plan of same.

Similar numerals of reference indicate corresponding parts in both figures.

1 is a shell forming what I term a "gas-generator." It is preferably of cylindrical form and preferably composed of metal.

2 is a refractory lining, preferably in the form of fire-brick, contained within the body of the shell 1.

3 is a chamber contained within the upper portion of the shell 1.

4 is a chamber contained within the lower portion of the shell 1.

5 is a partition or dividing wall separating the chambers 3 and 4.

6 is an outlet-opening from the top of chamber 4.

7 is an inlet-opening from the bottom of chamber 5.

8 is a valve connecting the openings 6 and 7.

9 is a gas dip-pipe sealing in a hydraulic seal in the usual manner.

10 is a hydraulic seal.

11 is an outlet stack-valve closing an opening at top of generator.

12 is a suitably-controlled oil-supply pipe entering at top of chamber 3.

13 is a valve controlling air-blast opening at bottom of chamber 4.

14 is an oil-injector of usual form.

15 is an oil-pipe supplying injector 14.

16 is a steam-supply pipe entering injector 14.

17 is an ordinary tubular condenser.

18 is an ordinary hydraulic seal.

19 is a gas-outlet pipe extending from bottom of chamber 3 and entering hydraulic seal 18 in such a manner as to form a dip-seal.

20 is a pipe connecting hydraulic seal 18 with top of condenser 17.

21 is a pipe connecting bottom of condenser 17 with bottom of chamber 4.

22 is a controlling-valve in pipe 21.

23 is a tar-overflow pipe.

24 is a tar-well in which overflow-pipe 23 dips and seals.

25 is an open-work checker filling of refractory substance, preferably in the form of loosely-piled fire-bricks, contained within the chamber 3.

26 is an open checker filling of refractory substance, preferably in the form of loosely-piled fire-bricks, contained within the chamber 4.

When I desire to put this apparatus into operation, I proceed as follows: I close valve 22 and open valve 8 and stack-valve 11. I then build a light fire in the bottom of chamber 4, the combustion of which I support by air admitted, preferably in the form of forced blast, through valve 13. This light fire serves to ignite hydrocarbons, which I admit through injector 14 and with which I heat to a high degree the loosely-piled stack of refractory substance 26 contained within the chamber 4. The products of combustion of the burning hydrocarbons escape from outlet 6 at top of chamber 4, through valve 8 and through opening 7, into the bottom of the chamber 3, through which they pass and heat the mass of loosely-piled refractory substance 25 contained therein, the products of combustion finally escaping into the atmosphere through the stack-valve 11. It will be seen that the refractory substances 26 and 25 are heated in a gradually-decreasing ratio, the hottest portion being that next adjacent to the bottom of the chamber 4, wherein the combustion of the hydrocarbon takes place. When the refractory substances 26 and 25 have become properly heated, which can be observed through sight-holes conveniently placed through the side of shell 1, I discontinue the heating operation by closing off the combustion of the hydrocarbon at the injector 14 and air-blast at valve 13. I then close the stack-valve 11 and valve 8 and open valve 22. I then admit hydrocarbon, preferably in the form of crude petroleum or its derivatives and preferably introduced in the form of a finely-divided spray, through inlet-pipe 12, which, owing to the heat contained within the chamber 3, is quickly vaporized, and the vapors, passing downward over the mass of refractory substance 25, are converted partially into fixed gases and partially into condensable hydrocarbon substances, usually in the form of oil-tars, the mixture of gas and tarry vapors so formed passing from the bottom of chamber 3, through pipe 19, into the seal 18, wherein the tars are partially condensed, and from whence they pass through pipe 20 into the top of condenser 17, through which they pass, and the balance of the tarry substances are therein condensed and dropped from the gas and collected in the bottom of the condenser 17, through which they flow through pipe 23 and are collected in the well 24, while the gas, freed from its tarry vapors, passes through pipe 21 into the bottom of the chamber 4, at which point it has been most highly heated, and simultaneously with the passage of the gas into the chamber 4 I admit steam through pipe 16. The gas passing upward through chamber 4 comes in contact with the very highly heated refractory substance 26 contained within the chamber 4, and a portion of the heavy hydrocarbons of the same are broken down into solid carbonaceous form, in which condition the oxygen of the steam admitted through the valve 16 unites with the solid carbon formed, resulting in a decomposition of the steam and its conversion, together with the carbon, into the so-called "water-gas," the mixture of water and oil gases thus formed passing up through chamber 4, over the surfaces of the highly-heated refractory substance 26, and finally escaping through outlet-pipe 6 and dip-seal pipe 9 into hydraulic seal 10, from whence they pass to washers and scrubbers and are cleansed in the usual manner. When the heat contained within the refractory substances 25 and 26 falls too low for the proper decomposition of the oil, as described, I discontinue the gas-making stage by closing off hydrocarbon-supply from pipe 12 and steam-supply from pipe 16, and after closing valve 22 and opening valves 8 and 11 I reheat the apparatus in the manner first described until it is again sufficiently hot for gas-making purposes, after which, by the manipulations previously described, I again enter upon the gas-making stage, it thus being seen that the operations of heating and gas-making are intermittent and alternate.

If in heating the apparatus described I find it necessary so to do, I use a second hydrocarbon-injector (not shown) at the bottom of chamber 3, in which case I also supply an air-blast (not shown) to that portion of the apparatus for the purpose of supporting combustion therein.

The valve 22 is not essential to the principle involved in this method of gas manufacture; but for safety in the prevention of the formation of explosive mixtures in the condenser 17 I prefer its use.

This gas-making apparatus can be of any convenient form and construction, and I do not limit myself to any particular design; but in ordinary operation I prefer the arrangement as shown.

Having thus described my invention, I claim—

1. The process of manufacturing gas, which consists in highly heating a mass of suitable refractory material, subsequently bringing into contact therewith suitable hydrocarbons and carbonaceous substances, preferably in the form of petroleum-oils, the heat being so great as to convert the same into a mixture of gases, solid carbonaceous substances and condensable hydrocarbon compounds, simultaneously admitting steam in sufficient quantity to combine with substantially the whole of said carbonaceous substances and form carbon monoxid and hydrogen, and subsequently recovering the fixed gases, and condensable compounds in their separate forms, substantially as described.

2. The process of manufacturing gas, which consists in highly heating a mass of refractory substance contained within a gas-generator, and subsequently bringing into contact with a portion thereof hydrocarbon vapors, subjecting the same to only a sufficient degree of heat to convert the vapors into fixed gases and condensable hydrocarbon substances, subsequently removing the condensable hydrocarbons and resubjecting the remaining gases to a degree of heat sufficient for breaking down a portion of same into solid carbonaceous form, substantially as shown and described.

3. The process of manufacturing gas, which consists in highly heating a mass of refractory substance contained within a gas-generator, and subsequently bringing into contact with a portion thereof hydrocarbon vapors, subjecting the same to only a sufficient degree of heat to convert the vapors into fixed gases and condensable hydrocarbon substances, subsequently removing the condensable hydrocarbons and resubjecting the remaining gases to a degree of heat sufficient for breaking down a portion of same into solid carbonaceous form, simultaneously admitting steam for the purpose of decomposing same in contact with the solid carbons formed as described, and mingling the water and oil gases formed, substantially as shown and described.

4. The process of manufacturing gas, which consists in highly heating masses of refractory substances contained within a gas-generator and subsequently bringing hydrocarbon vapors into contact with a portion thereof at its coolest part, passing the vapors downward over the heated refractory substances in a direction opposite to that in which it was heated, converting the vapors into fixed gases and condensable hydrocarbons, subsequently removing the condensable hydrocarbons and resubjecting the gas to a high degree of heat by bringing it into contact with the surfaces of a portion of the said refractory substances by passing over same in the direction in which it was heated, thus breaking down a portion of the heavy hydrocarbons of the gas into solid carbonaceous form, substantially as shown and described.

5. The process of manufacturing gas, which consists in highly heating masses of refractory substances contained within a gas-generator and subsequently bringing hydrocarbon vapors into contact with a portion thereof at its coolest part, passing the vapors downward over the heated refractory substances in a direction opposite to that in which it was heated, converting the vapors into fixed gases and condensable hydrocarbons, subsequently removing the condensable hydrocarbons and resubjecting the gas to a high degree of heat by bringing it into contact with the surfaces of a portion of the said refractory substances by passing over same in the direction in which it was heated, thus breaking down a portion of the heavy hydrocarbons of the gas into solid carbonaceous form, simultaneously admitting steam for the purpose of effecting its decomposition in contact with the solid carbon formed, as described, mingling the water and the oil gases formed, substantially as shown and described.

6. The process of manufacturing gas which consists in highly heating two masses of refractory material by passing hot gases in succession therethrough, then passing fluid hydrocarbon through the masses of refractory material last heated, condensing the heavy vapors therefrom, commingling the gas, so freed, with steam, and passing the mixed steam and gas through the other mass of refractory material in the same direction as the heating thereof.

In witness whereof I have hereunto set my hand in the presence of two subscribing witnesses.

L. P. LOWE.

Witnesses:
E. W. HORNE,
S. McLAUGHLIN.